United States Patent [19]

Hjelmnér et al.

[11] 4,126,546

[45] Nov. 21, 1978

[54] METHOD FOR THE FILTRATION OF A SUSPENSION OR EMULSION

[75] Inventors: Ulf R. Hjelmnér, Nynäshamn; Hans F. Larsson, Västerhaninge, both of Sweden

[73] Assignee: Rederiaktiebolaget Nordstjernan, Stockholm, Sweden

[21] Appl. No.: 771,138

[22] Filed: Feb. 23, 1977

[51] Int. Cl.² .............................................. B01D 23/24
[52] U.S. Cl. ....................................... 210/19; 210/25; 210/77; 210/80; 210/82
[58] Field of Search ........................ 210/19, 20, 25, 33, 210/34, 35, 80, 81, 82, 104, 108, 131, 189, 268, 274, 275, 285, 67, 77, 84, 96 R

[56] References Cited

U.S. PATENT DOCUMENTS

| | | | |
|---|---|---|---|
| 2,057,887 | 10/1936 | Elliott et al. | 210/80 |
| 3,395,099 | 7/1968 | Johnson | 210/82 |
| 3,512,640 | 5/1970 | Hellmann | 210/80 |
| 3,537,582 | 11/1970 | Demeter | 210/268 |
| 3,563,385 | 2/1971 | Bykov | 210/268 |
| 3,581,895 | 6/1971 | Howard et al. | 210/108 |
| 3,667,604 | 6/1972 | Lagoutte | 210/268 |
| 3,707,230 | 12/1972 | Davidson | 210/19 |
| 3,841,485 | 10/1974 | Malkin | 210/108 |

OTHER PUBLICATIONS

Libby et al., Chemical-Physical Treatment of Municipal Wastewater Using Continuous Countercurrent Filtration, Journal Water Pollution Control Federation, vol. 44, No. 4, Apr. 1972, p. 574–582.

The Johns-Manville Moving Bed Filter System for Treatment of Sewage, Johns-Manville Environmental Control Systems technical bulletin No. MBF-1.

Allanson et al., Development of a Continuous Inclined Sand Bed Filter, paper presented at Filtration Society's Conference on Liquid Solid Separation, London, Sep. 16–19, 1975.

*Primary Examiner*—Thomas G. Wyse
*Assistant Examiner*—Ivars Cintins
*Attorney, Agent, or Firm*—Brumbaugh, Graves, Donohue & Raymond

[57] ABSTRACT

A suspension or emulsion is filtered by causing the same to flow upwards through a zone of filter medium of particle size forming a filter bed while the filter medium concurrently flows in a downward direction through the filter bed zone. Dirty filter medium at the bottom of the filter bed zone is transported to a wash device located above the filter bed zone and is washed as the dirty medium passes downward along a washpath in the wash device in counter current flow to wash liquid which passes upward though the wash device, whereafter the washed medium is returned to the top of the filter bed zone. A zone of filtrated liquid phase is maintained above the filter bed, and a portion of said filtrated liquid phase is supplied to the wash device as the wash liquid.

10 Claims, 3 Drawing Figures

METHOD FOR THE FILTRATION OF A SUSPENSION OR EMULSION

The present invention relates to a method for the filtration of a suspension or emulsion.

It is already known that filtration of a suspension or emulsion can be effected by supplying the suspension (or emulsion) to a filter bed, consisting of a filter medium of particle size, enclosed in a tank, allowing the suspension to flow upwards through the filter bed, and in some appropriate manner allowing the filtrated liquid phase obtained by the filtration to discharge from the filter bed through outlet means provided with some appropriate cover means, for instance a jalousie wall or screen, in order to prevent the filter medium from escaping together with the filtrated liquid phase. In one type of such a filtration apparatus it is also known in order to obtain a continuously operating filtration apparatus, i.e. without shutting off the filtration during the cleaning of the filter medium, to allow the filter medium, while the filtration is going on, to flow downwardly through the filtration tank, remove the dirty (contaminated) filter medium in the course of filtration from the base of the tank to a pipe positioned outside of the tank, allow the dirty filter medium to pass through a washing device, and return the cleaned filter medium from the washing device to the surface of the filter bed in the tank. In another known filtration apparatus, likewise provided with a washing device positioned outside of the filtration tank but without filtration in counter-current between the filter medium and the suspension, the filtration of the filter medium takes place during the flow thereof in counter-current to the wash liquid which is taken out from the pipe for delivering the suspension to be filtrated.

The object of the present invention is to provide a method of filtering, using a continuously operating filter, which — besides utilizing the advantage of an effective use of the filter bed by counter-current flow, known per se, between the filter medium and the suspension during the filtration and utilizing the advantage of improved washing by counter-current flow between the filter medium and the wash liquid, likewise known per se but in another filtering application — gives with simple means during reliable operation high capacity in relation to required space, always gives substantially the same filtering capacity and at the same time guarantees an increased efficiency in the washing of the filter medium.

The present invention, as mentioned above in connection with the statement of prior art, relates to a method for the filtration of a suspension or emulsion, which is supplied to a zone of filter medium of particle size forming a filter bed, flows during the filtration in an upward direction through the filter bed and is discharged from the filter bed as filtrated liquid phase, during which filtration the filter medium flows in a downward direction through the filter bed zone in counter-current to the suspension past the inflow of the suspension into the filter bed and thereafter is transported separated from the filter bed to a wash path for the washing of the dirty filter medium during flow in counter-current to a wash liquid along the wash path, whereupon the washed filter medium is returned to the filter bed zone at the top surface thereof.

The novel and characterizing features of the method according to the invention are, that at least a part of the filtrated liquid phase is discharged from the filter bed zone for maintaining above this zone a zone of filtrated liquid phase, that said separated transport of the dirty filter medium takes place upwards through the filter bed zone, and that said counter-current washing of the dirty filter medium along the wash path takes place during flow of the dirty filter medium in counter-current to filtrated liquid phase utilized as wash liquid, which liquid phase is supplied to the wash path from said zone of filtrated liquid phase.

Thus, according to the invention the total filtering and washing process can take place within the filtration apparatus and filtrated liquid phase, the clarified liquid, obtained by the filtration is in a simple and advantageous manner utilized as wash liquid.

Within the frame of the present invention further improvements can be effected to make the washing as well as the filtration still more effective. Thus, measures can be taken during the washing in order to increase the relative velocity between the filter medium and the wash liquid momentaneously at least once, which creates especially favourable conditions for the washing of the filter medium, in order to decelerate the filter medium at least once and thereby increase the contact time between the filter medium and the wash liquid, which results in an increased effectivness of the washing, and in order to break up possible caked aggregates of filter medium by the dirtying. Moreover according to the invention, the quantity of the wash liquid flowing along the wash path can be controlled. As to the quantity of filter medium transported to the wash path this quantity can according to the invention also be automatically controlled in order to constantly achieve an appropriately adapted flow of filter medium to the wash path, and this control can be made by sensing the quantity or pressure of the suspension before its supply to the filter bed zone. Finally, by a method according to the invention, air coming from an air supply for the transport of the dirty filter medium and extruded thereinto can be prevented from infiltrating into the filter bed zone by being previously trapped and discharged, whereby risk for local fluidizing of the filter bed, which could result in substantial reduction of the filtering capacity of the filter bed, is eliminated.

The invention also relates to a filtration apparatus for carrying out the above mentioned method. The filtration apparatus includes a zone of filter medium of particle size forming a filter bed and having an extension in vertical direction in the apparatus, inlet means for the suspension or emulsion to be filtrated, said inlet means being positioned in the lower part of the filter bed zone for suspension flow during the filtration in the direction upwards through the filter bed, a space located below said inlet means and being in free communication with the filter bed zone, to which space the filter medium continuously is supplied by flow in the direction downwards through the filter bed zone, and a transport device for hauling the filter medium supplied to said space and dirtied by the filtration up to a wash device which is arranged and constructed for washing in counter-current between the filter medium and a wash liquid and provided with means for returning the washed filter medium to the top surface of the filter bed. The characterizing features of the filtration apparatus according to the invention are that above said filter bed zone is maintained a zone of filtrated liquid phase obtained by the filtration, that the transport device comprises a pipe, which from said space is drawn up through the filter bed zone to at least the upper part of said zone of filtrated liquid phase and is connected to the upper part of the wash device, and that the lower part of the wash device is provided with at least one inlet means, which is connected to said zone of filtered liquid phase. In a preferred embodiment of the invention, which in respect to operation and construction is simple, the wash device is immersed in said zone of filtrated liquid phase and has its lower end located above the filter bed zone.

The specific features and advantages of this invention will appear more completely from the following claims and from the following description of a typical embodiment thereof which is given by way of example with reference to the accompanying drawings, in which:

Figure 1:
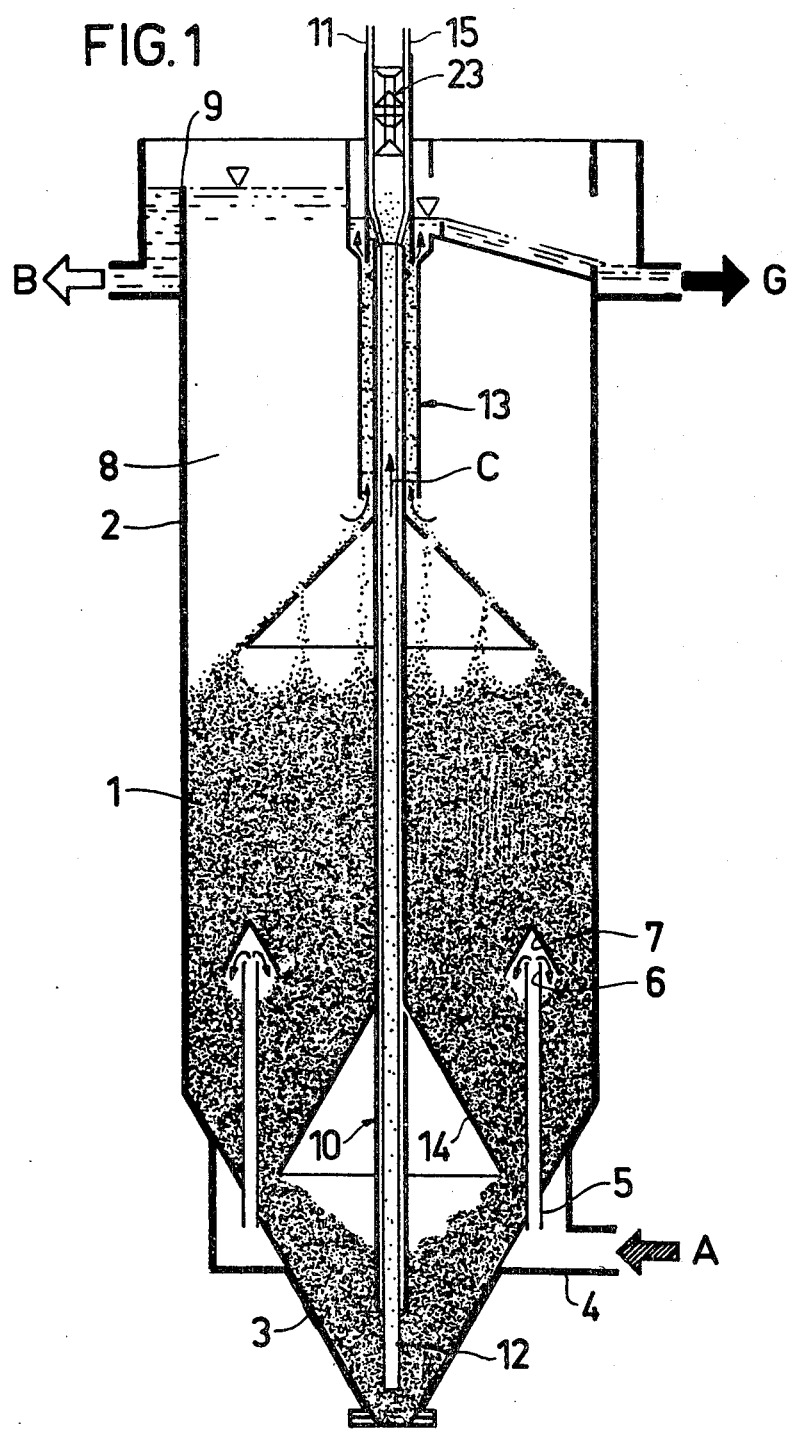
FIG. 1 is a vertical section of a filtration apparatus in accordance with this invention.

In the apparatus illustrated in FIG. 1 a particle filter medium 1 is enclosed in a tank having walls 2 and a funnel-shaped bottom 3. The base of the cone or pyramid 3 should preferably coincide to the form of the tank as defined by the walls 2.

Sand is well adapted for use as the filter medium 1. However other materials, such as plastic can be used, or mixtures of several materials. A mixture of several grainsize fractions can be used in a continuously operating filter according to the invention contrary to conventional techniques, however depending on what shall be filtrated and how effective the filtration shall be carried out. A man skilled in the art can readily determine after tests the most suitable material and grain size in each particular case.

The suspension or emulsion to be filtered is supplied, as shown by arrow A, to the tank through inlet 4, preferably as shown through the bottom of the tank. The flow of the suspension into the filter bed 1 takes place in the lower part of the filter bed via a number of pipes 5 having pipe mouths 6. A roof 7 is arranged above each pipe mouth 6 in order to prevent the filter medium from coming in direct contact with the pipe mouths and in order to expose a larger surface of the filter medium to the supplied suspension. By this arrangement the risk of clogging of the filter due to substantial momentaneous dirtying of the filter medium close to the pipe mouths is reduced. The roofs 7 have a V-shaped cross section and due to this and to the arrangement of the pipe mouths with roofs, the movement of the filter medium downwards is considerably reduced. The arrangement of the inlet pipe mouths 6 in the lower part of the filter bed has the advantage that the filter medium being most dirtified, i.e. the filter medium passing the roofs and the pipe mouths, continues downwards and is no longer utilized for the filtration. By this, clogging at the inlets is prevented and new filter medium is always exposed to the incoming suspension. The incoming suspension flows in counter-current to the filter medium upwards through a zone of the filter bed towards more and more clean filter medium. The filtrated liquid phase obtained during the flow of the suspension upwards through the filter bed zone is kept as a zone 8 of filtrated liquid phase above the filter bed and its surface level is in the shown embodiment fixed by discharging the filtrated liquid phase from the filtration apparatus via a weir 9 to an outlet (arrow B).

In the tank bottom 3, down into which the dirty filter medium flows, the mouth of a fitted hauling device 10 is located. As appears from the illustrated embodiment the hauling device extends centrally through the apparatus and can for instance consist of a mammoth pump. Such a pump operates with air as the transport medium, and the air is supplied from above downwards along a pipe 11 extending alongside a transport pipe 12 forming a part of the hauling device. The air is supplied to the transport pipe 12 through holes (not shown) in the lower part of the pipe. The filter medium is transported (arrow C) by the air through the pipe 12 up to a wash device 13 positioned above the filter bed. The wash device shall be described below more in detail.

If the air conducted into the mammoth pump for some reason should extrude through the lower part of the transport pipe 12 and infiltrate into the filter medium, there is a risk for local fluidizing of the filter medium resulting in a substantial reduction of the filtering capacity of the filter. In order to prevent such a disturbance a funnel 14 turned upside down is placed around the mammoth pump above the bottom mouth. The funnel catches possible air gone astray and the caught air is discharged through holes in the top end of the funnel to a pipe 15 extending alongside the transport pipe. The funnel also serves as guide means for the flow of the filter medium downwards, so that a uniform flow profile (flow characteristic) is obtained over the cross section of the apparatus.

The above-described roofs 7 positioned above the inlets 6 contributes as well as the funnel 14 to achieve desired flow profile. Such roofs can, although not shown, in order to still more ensure a desired flow profile be arranged in the filter bed at other appropriate places and without being combined with inlets for the suspension.

Figure 2:
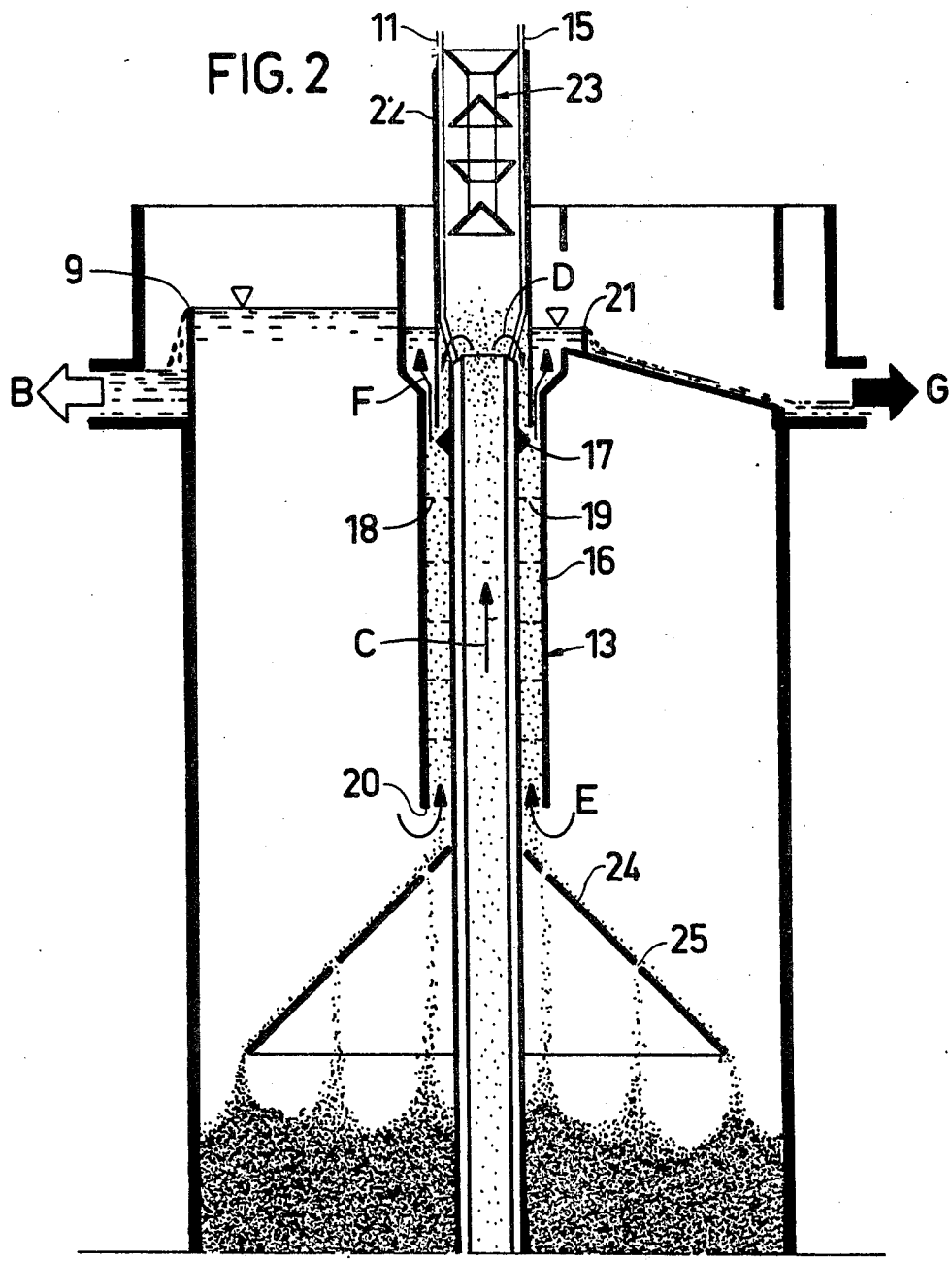
FIG. 2 shows in larger scale the upper portion of the filtration apparatus of FIG. 1 in order to illustrate more clearly the wash device of the filtration apparatus.

The wash device 13 is shown in larger scale in FIG. 2. The filter medium to be washed arrives from the upper end of the transport pipe 12, turns (arrow D) and flows downwards along a wash path formed by the space between the transport pipe 12 and an outer pipe 16. The outer pipe 16 is preferably concentrically arranged relative to the transport pipe 12. The filter medium can, owing to its dirty nature contain aggregates baked together. Such possible aggregates are broken up when they hit a plate or the like 17 positioned in the flow path of the filter medium, at the same time as the velocity of fall of the filter medium is decelerated. The filter medium hits thereafter further down in the wash path an intermediate partition 18 provided with holes 19, preferably followed by a number of additional intermediate partitions of similar shape. In the embodiment shown there are five intermediate partitions. The holes 19 in two adjacent partitions are preferably displaced in relation to each other, so that a vertical free passage for the filter medium is prevented. Due to this, there is a frequent deceleration of the filter medium during its passage through the wash device. The filter medium meets all the time a wash liquid in counter-current and at the holes in the intermediate partitions the velocity of the wash liquid becomes momentaneously higher, which results in especially favourable conditions for the washing of the filter medium.

The filtrated liquid phase in zone 8 positioned above the filter bed is used as wash liquid. The wash device is in this respect immersed into the filtrated liquid phase in zone 8 and, as shown with arrow E in the illustrated embodiment, the wash liquid, i.e. the filtrated liquid phase, is supplied to the wash path through the opening 20 between the lower end of the outer pipe 16 and the transport pipe 12 and flows upwards along the wash path. The wash liquid which becomes dirty during the washing, i.e. the reject, is discharged from the wash path as shown with arrow F, flows over a weir 21 and is discharged from the apparatus as shown with arrow G. This weir can be adjustable as to its height and width position, thereby making it possible to control the quantity of wash liquid. For instance, the quantity of wash liquid is increased upon lowering of the weir. The quantity of wash liquid is also automatically increased when the level of the filtrated liquid above the filter bed arises, for instance by increased load on the filtration apparatus.

In order to guide the filter medium, discharged from the transport pipe 12, downwardly to the wash path and in order to separate the reject from the filter medium, a pipe 22 is arranged between the outer pipe 16 and the transport pipe 12, said pipe 22 being lowered a distance past the top end of the transport pipe.

The pipe 22 projects out of the outer pipe 16 and air supply pipe 11 and air discharge pipe 15 are drawn through the pipe 22. The pipe 22 also encloses a device 23 for capturing air from the transport pipe 12 containing filter medium. In the illustrated embodiment this capturing device consists of downwardly faced cones and upwardly faced truncated cones, alternatively arranged.

Although not shown, a part of the filtrated liquid phase can, if desired, be taken out within the filter bed zone below its top surface by arranging outlet pipe mouths for filtrated liquid phase, preferably substantially vertically above the inlet pipe mouths 6. Moreover, these outlet pipe mouths can preferably be provided with roofs in conformity with the roofs 7 above the inlet pipe mouths 6. By taking out the filtrated liquid phase through such outlet pipe mouths positioned within the filter bed zone below the top surface thereof a satisfactory filtrated liquid phase is ensured also upon for instance possible shutdowns in the wash device, in which case the filtrated liquid phase existing above the filter bed could be dirty.

Below the bottom end of the wash device a cone 24 is arranged for spreading the filter material coming from the wash device out over the top surface of the filter bed. Moreover, the cone 24 is provided with a suitable number of holes 25 in order to obtain a supply of filter medium particles to the surface of the filter bed positioned below the cone.

Besides the above described automatic control of the wash liquid quantity also an automatic control of the quantity of filter medium supplied to the wash can, although not shown, be accomplished. By placing a quantity sensing or pressure sensing means in the supply pipe 4 for the suspension, a signal indicating a change, for instance a pressure increase due to accumulation of suspended material in the filter bed, is obtained. This signal can in a manner known per se be used for the control of the capacity of the hauling device 10, so that the transported quantity of filter medium to the wash device is increased or decreased.

In the embodiment described above and shown in the drawings the wash device is immersed in the zone 8 of filtrated liquid phase and the filtrated liquid phase is from this zone admitted as wash liquid into the wash device through the opening 20. The filtrated liquid phase utilized for the washing can, however, alternatively be laterally admitted through one or several openings in the outer pipe 16 at the lower portion thereof. In another alternative embodiment, not shown, in which likewise filtrated liquid phase from the zone 8 is utilized as wash liquid, at least a part of the wash device is immersed into and separately arranged relative to the filter bed and one or several pipes are drawn from the zone 8 to the lower portion of the wash device for the supply of the wash liquid to the wash device so positioned.

Figure 3:
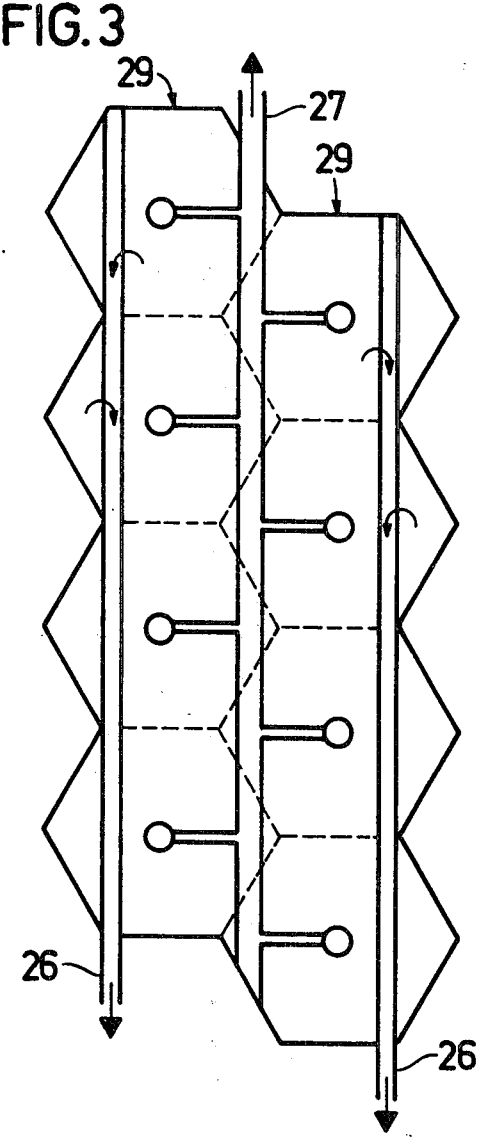
FIG. 3 schematically depicts from above a number of filtration apparatus is constructed in accordance with the present invention and assembled together to form a filtration unit.

A filtration apparatus according to the invention, for instance the preferred embodiment described above and shown in FIGS. 1 and 2, makes a construction with comparatively small dimensions possible and thereby the advantage is achieved that the apparatus is easy to handle and easy to attend in operation. Moreover, due to the fact that all elements required for the continuously operating apparatus are positioned within the apparatus and furthermore that certain devices, for instance the wash device and the hauling device, can be formed as units, the apparatus is well adapted to be built as a module. When greater filtration capacities than one single apparatus can produce are required it is, due to this modular construction possible to build together in a simple and advantageous way several apparatuses into one large filtration plant. Such a filtration plant is exemplified and somewhat schematically shown in FIG. 3 and comprises a group of eight module-built filtration apparatuses joined together. All devices and elements required for the operation of a filtration apparatus according to the invention, for instance a filtration apparatus as shown in FIGS. 1 and 2, are embodied in each module. However, the walls 2, which border against each other in the group, are removed (the dashed lines in FIG. 3 are intended to illustrate the upper edge of the bottoms 3). Furthermore, for each row 29 of filtration apparatuses there is a common outlet 26 for the filtrated liquid phase discharged from each filtration apparatus (arrow B in FIGS. 1 and 2), and for both rows 29 there is a common outlet 27 for the reject from the wash device (arrow G in FIGS. 1 and 2). It is not necessary to arrange these common outlets 26 and/or 27 as shown, but such an arrangement obviously simplifies the construction. The outer wall enclosing the filtration apparatus can consist of walls 2 in each filtration apparatus, but alternatively all walls 2 in each filtration apparatus can be removed and a separate outer wall can be built around the filtration plant.

As is also evident from FIG. 3, each apparatus module has a hexagonal form in cross section. This form allows simple joining to larger filtration plants. Other forms are, however, possible to use, for instance square, which also allows simple joining. A square form can, however, compared with for instance hexagonal form be less suitable due to the fact that the filter medium situated in the corners is decelerated in its movement downwards and furthermore takes a less active part in the filtration.

We claim:

1. In a method for filtering wherein a suspension or emulsion to be filtered is supplied to a zone of particle filter medium forming a filter bed, the suspension being filtered flows, during the filtration thereof, in an upward direction through the filter bed and is discharged from the filter bed as filtrated liquid phase, and wherein the filter medium during the filtration flows in a downward direction through the filter bed in counter-current to the suspension past the inflow of the suspension and thereafter is transported separated from the filter bed to a wash path for washing the dirty filter medium during flow along the wash path in counter-current to a wash liquid, whereupon the washed filter medium is returned to the filter bed zone to its top surface, the improvement wherein at least a part of the filtrated liquid phase which is discharged from the filter bed zone is maintained above this zone as a zone of filtrated liquid phase in direct contact with the filter bed zone, said separated transport of the dirty filter medium takes place upwards through the filter bed zone, and said counter-current washing of the dirty filter medium along the wash path takes place during flow of the dirty filter medium in counter-current to a portion of said filtrated liquid phase utilized as wash liquid, said portion of said filtrated liquid phase being supplied to the wash path from said zone of filtrated liquid phase.

2. A method according to claim 1, characterized in that during the washing of said filter medium, the relative velocity between the filter medium and the wash liquid is increased momentaneously at least once.

3. A method according to claim 1, characterized in that during the washing of said filter medium, the flow velocity of the filter medium is decelerated at least once.

4. A method according to claim 3 characterized in that said deceleration takes place along a zone of the wash path followed by a momentaneous increase in the flow velocity of the filter medium.

5. A method according to claim 1 characterized in that caked aggregates of said dirty filter medium are broken up prior to the washing of said filter medium.

6. A method according to claim 1 wherein the quantity of the wash liquid flowing along the wash path is controlled.

7. A method according to claim 6, characterized in that the quantity of wash liquid is controlled by adjustment of the outflow of dirty wash liquid obtained during the washing step.

8. A method according to claim 6, characterized in that the quantity of wash liquid is controlled by changing the level of said zone of filtrated liquid phase.

9. A method according to claim 1 including the step of controlling the quantity of the filter medium which is transported to the wash path by quantity sensing or pressure sensing of the suspension prior to the supply thereof to the filter bed zone.

10. A method according to claim 1 wherein air is used for the transport of the dirty filter medium to said wash path, the supplied air for said transport being extruded into the dirty filter medium and, prior to said extrusion, being trapped and discharged to prevent the air from infiltrating into the filter bed zone.

* * * * *

REEXAMINATION CERTIFICATE (2008th)

United States Patent [19]
Hjelmnér et al.

[11] B1 4,126,546
[45] Certificate Issued May 18, 1993

[54] METHOD FOR THE FILTRATION OF A SUSPENSION OR EMULSION

[75] Inventors: Ulf R. Hjelmnér, Nynäshamn; Hans F. Larsson, Västerhaninge, both of Sweden

[73] Assignee: Axel Johnson Engineering AB, Nynaeshamn, Sweden

Reexamination Request:
No. 90/002,246, Jan. 7, 1991

Reexamination Certificate for:
Patent No.: 4,126,546
Issued: Nov. 21, 1978
Appl. No.: 771,138
Filed: Feb. 23, 1977

[51] Int. Cl.$^5$ .............................................. B01D 24/46
[52] U.S. Cl. ................................. 210/741; 210/744; 210/786; 210/793; 210/799
[58] Field of Search ............... 210/741, 744, 786, 793, 210/799

[56] References Cited

U.S. PATENT DOCUMENTS 2,715,964  8/1955  Martin ................................. 210/128
3,537,582  11/1970  Demeter ............................. 210/189

*Primary Examiner*—Ivars Cintins

[57] ABSTRACT

A suspension or emulsion is filtered by causing the same to flow upwards through a zone of filter medium of particle size forming a filter bed while the filter medium concurrently flows in a downward direction through the filter bed zone. Dirty filter medium at the bottom of the filter bed zone is transported to a wash device located above the filter bed zone and is washed as the dirty medium passes downward along a washpath in the wash device in counter current flow to wash liquid which passes upward through the wash device, whereafter the washed medium is returned to the top of the filter bed zone. A zone of filtrated liquid phase is maintained above the filter bed, and a portion of said filtrated liquid phase is supplied to the wash device as the wash liquid.

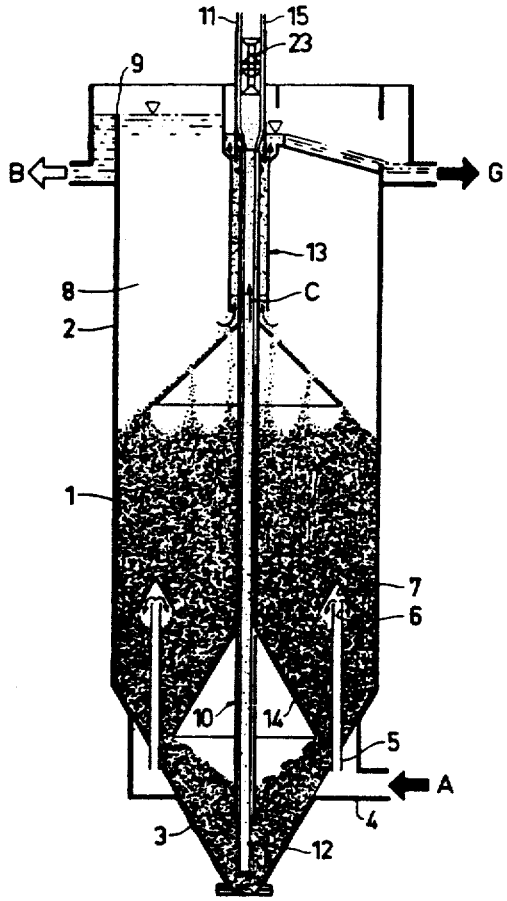

REEXAMINATION CERTIFICATE ISSUED UNDER 35 U.S.C. 307

NO AMENDMENTS HAVE BEEN MADE TO THE PATENT

AS A RESULT OF REEXAMINATION, IT THAS BEEN DETERMINED THAT:

The patentability of claims 1-10 is confirmed.

* * * * *